United States Patent
Ideura et al.

(10) Patent No.: US 8,245,072 B2
(45) Date of Patent: Aug. 14, 2012

(54) SIGNAL TRANSMISSION SYSTEM AND CONTROL METHOD THEREFORE

(75) Inventors: Katsuji Ideura, Shinagawa (JP); Fujio Seki, Shinagawa (JP); Satoshi Sakurai, Shinagawa (JP); Kazuhiro Yasuno, Shinagawa (JP); Takashi Iwao, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 777 days.

(21) Appl. No.: 12/292,336

(22) Filed: Nov. 17, 2008

(65) Prior Publication Data

US 2009/0128696 A1 May 21, 2009

(30) Foreign Application Priority Data

Nov. 20, 2007 (JP) ................. 2007-300569

(51) Int. Cl.
*G06F 1/12* (2006.01)
(52) U.S. Cl. ........ 713/400; 348/521; 348/537; 348/540; 345/204; 345/213; 345/214
(58) Field of Classification Search .............. 345/29, 345/204, 213, 214, 691; 348/521, 533, 537, 348/540, 572, 642; 713/400
See application file for complete search history.

(56) References Cited

U.S. PATENT DOCUMENTS

| | | | | |
|---|---|---|---|---|
| 4,658,300 A | * | 4/1987 | Kawamura et al. | 358/409 |
| 4,713,691 A | * | 12/1987 | Tanaka et al. | 348/537 |
| 4,788,601 A | * | 11/1988 | Kawasaki | 386/271 |
| 5,309,111 A | * | 5/1994 | McNeely et al. | 327/7 |
| 5,917,461 A | * | 6/1999 | Sakami et al. | 345/29 |
| 5,982,408 A | * | 11/1999 | Overall et al. | 347/250 |
| 6,137,536 A | * | 10/2000 | Yamaguchi | 348/521 |
| 6,188,443 B1 | * | 2/2001 | Mori et al. | 348/572 |
| 6,268,889 B1 | * | 7/2001 | Koori | 348/642 |
| 6,323,910 B1 | * | 11/2001 | Clark, III | 348/537 |
| 6,348,931 B1 | * | 2/2002 | Suga et al. | 345/699 |
| 6,392,641 B1 | * | 5/2002 | Nishimura et al. | 345/213 |
| 6,498,629 B1 | * | 12/2002 | Carpentier et al. | 348/807 |
| 6,750,856 B2 | * | 6/2004 | Shimamoto | 345/204 |
| 6,879,321 B2 | * | 4/2005 | Santou | 345/213 |
| 7,113,012 B2 | * | 9/2006 | Amin | 327/161 |
| 7,274,405 B2 | * | 9/2007 | Mori et al. | 348/484 |

(Continued)

FOREIGN PATENT DOCUMENTS

JP 2004-356939 12/2004

OTHER PUBLICATIONS

Gennum Corporation. GS4882, GS4982 Video Sync Separators with 50% Sync Slicing. Data Sheet. 1996.*

(Continued)

*Primary Examiner* — Matthew D Spittle
(74) *Attorney, Agent, or Firm* — Staas & Halsey LLP

(57) ABSTRACT

A signal transmission system includes a transmitting device and a receiving device. The transmitting device includes a superimposition portion that superimposes at least one synchronizing signal on at least one video signal among a plurality of video signals, and outputs the synchronizing signal and the video signal as a superimposition signal to a receiving device. The receiving device includes a separation portion that separates the superimposition signal into the synchronizing signal and the video signal, a first adjustment portion that adjusts an amount of delay of the separated video signal to another video signal, and a second adjustment portion that adjusts an amount of delay of the separated synchronizing signal.

12 Claims, 14 Drawing Sheets

U.S. PATENT DOCUMENTS

| | | | | |
|---|---|---|---|---|
| 7,277,104 | B2* | 10/2007 | Dickens et al. | 345/691 |
| 7,683,896 | B2* | 3/2010 | Odryna et al. | 345/204 |
| 2004/0252239 | A1* | 12/2004 | Niiyama | 348/561 |
| 2006/0072039 | A1* | 4/2006 | Na | 348/540 |
| 2006/0116030 | A1* | 6/2006 | Niiyama et al. | 439/894 |
| 2007/0296868 | A1* | 12/2007 | Hall | 348/685 |
| 2009/0055694 | A1* | 2/2009 | Ramesh et al. | 714/700 |

OTHER PUBLICATIONS

National Semiconductor. LM1881 Video Sync Separator. Data Sheet. May 2006.*

Silicon Labs. Timing and Synchronization in Broadcast Video. Revision 0.1. Aug. 2009.*

* cited by examiner

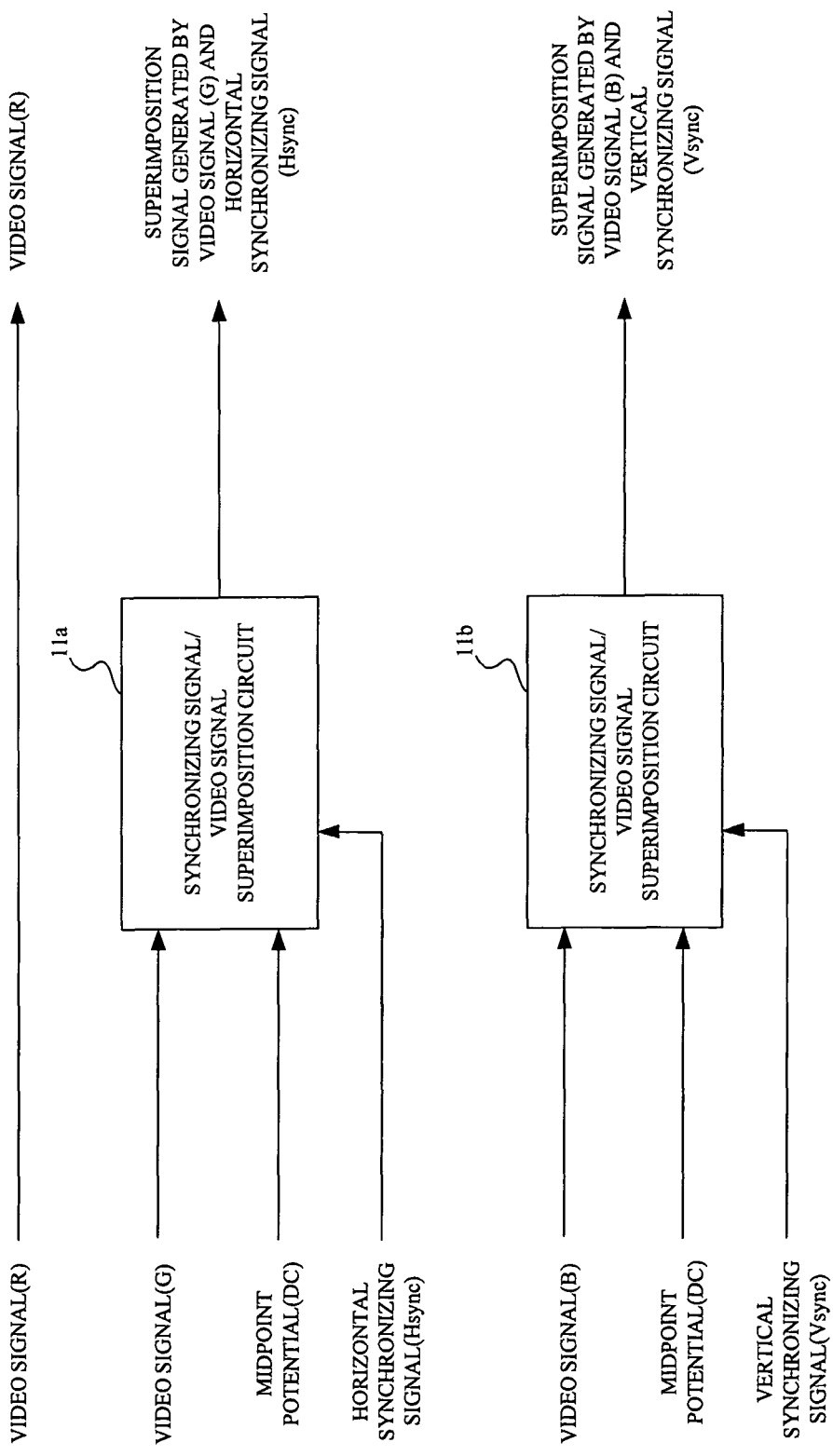

FIG. 3A
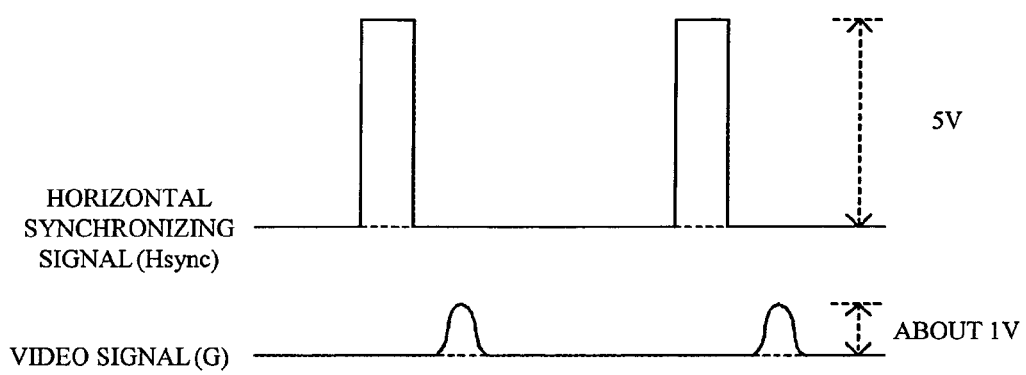
HORIZONTAL SYNCHRONIZING SIGNAL (Hsync) — 5V
VIDEO SIGNAL (G) — ABOUT 1V
MIDPOINT POTENTIAL (DC) — 2.5V
FIG. 3B
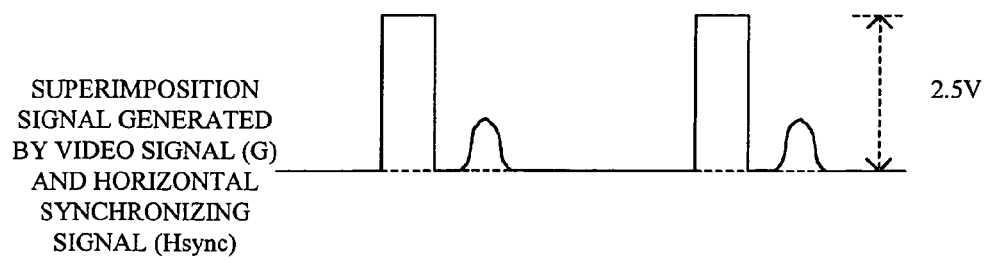
SUPERIMPOSITION SIGNAL GENERATED BY VIDEO SIGNAL (G) AND HORIZONTAL SYNCHRONIZING SIGNAL (Hsync) — 2.5V

SIGNAL TRANSMISSION SYSTEM AND CONTROL METHOD THEREFORE

BACKGROUND OF THE INVENTION

1. Field of the Invention

The present invention relates to a signal transmission system and a control method therefore which can transmit video signals over a long distance (for example, several hundred meters).

2. Description of the Related Art

Conventionally, when analog video signals of a computer, i.e., RGB signals are transmitted to a remote place with a Cat 5 (category 5) cable, it is known to cause deviations between a red signal, a green signal, and a blue signal which are received in the remote place, by the difference of real length of two or more pair lines, where the red signal, the green signal, and the blue signal are transmitted, contained in the cable.

For such deviations between the red signal, the green signal, and the blue signal, there has been proposed a remote system which corrects the deviations between the red signal, the green signal, and the blue signal with delay elements (see Japanese Laid-Open Patent Publication No. 2004-356939, for example).

Although the technique of Japanese Laid-Open Patent Publication No. 2004-356939 can correct the deviations between the red signal, the green signal, and the blue signal, timing relationship between the red signal, the green signal and the blue signal, and synchronizing signals transmitted together with these signals may deviate from a normal state. Accordingly, when the RGB signals are transmitted with the Cat 5 (category 5) cable having a length of several hundred meters, the lack, the displacement, and so on of display may be caused.

SUMMARY OF THE INVENTION

It is an object of the present invention to provide a signal transmission system and a control method therefore that can obtain a proper image even when video signals are transmitted over a long distance.

According to a first aspect of the present invention, there is provided a signal transmission system having a transmitting device including a superimposition portion that superimposes at least one synchronizing signal on at least one video signal among a plurality of video signals, and outputs the synchronizing signal and the video signal as a superimposition signal to a receiving device; and the receiving device including a separation portion that separates the superimposition signal into the synchronizing signal and the video signal; a first adjustment portion that adjusts an amount of delay of the separated video signal to another video signal; and a second adjustment portion that adjusts an amount of delay of the separated synchronizing signal.

According to a second aspect of the present invention, there is provided a signal transmission system including: a receiving device including a separation portion that separates a superimposition signal into a synchronizing signal and a video signal, and a first adjustment portion that adjusts an amount of delay of the separated video signal to another video signal; and a transmitting device including a second adjustment portion that adjusts an amount of delay of the synchronizing signal before the synchronizing signal is transmitted to the receiving device, and a superimposition portion that superimposes the synchronizing signal having the amount of delay adjusted by the second adjustment portion on a video signal to be included in the superimposition signal, and outputs the synchronizing signal and the video signal as the superimposition signal to the receiving device.

According to a third aspect of the present invention, there is provided a control method for a signal transmission system having a transmitting device and a receiving device, comprising the steps of: superimposing at least one synchronizing signal on at least one video signal among a plurality of video signals, and outputs the synchronizing signal and the video signal as a superimposition signal to the receiving device, in the transmitting device; and separating the superimposition signal into the synchronizing signal and the video signal, adjusting an amount of delay of the separated video signal to another video signal, and adjusting an amount of delay of the separated synchronizing signal, in the receiving device.

According to a fourth aspect of the present invention, there is provided a control method for a signal transmission system having a transmitting device and a receiving device, comprising the steps of: separating a superimposition signal into a synchronizing signal and a video signal, and adjusting an amount of delay of the separated video signal to another video signal, in the receiving device; and adjusting an amount of delay of the synchronizing signal before the synchronizing signal is transmitted to the receiving device, superimposing the synchronizing signal having the adjusted amount of delay on a video signal to be included in the superimposition signal, and outputting the synchronizing signal and the video signal as the superimposition signal to the receiving device, in the transmitting device.

BRIEF DESCRIPTION OF THE DRAWINGS

Preferred embodiments of the present invention will be described in detail with reference to the following drawings, wherein:

FIG. 2 is a block diagram showing the internal configuration of a transmitting device 10;

FIG. 3A is a diagram showing waveforms of a horizontal synchronizing signal, a video signal (G), and a midpoint potential before superimposition;

FIG. 3B is a diagram showing a waveform of an superimposed signal after the horizontal synchronizing signal is superimposed on the video signal (G);

FIG. 8 is a circuit diagram showing an analog delay circuit 23a;

DESCRIPTION OF THE PREFERRED EMBODIMENTS

A description will now be given, with reference to the accompanying drawings, of an embodiment of the present invention.

(First Embodiment)

Figure 1:
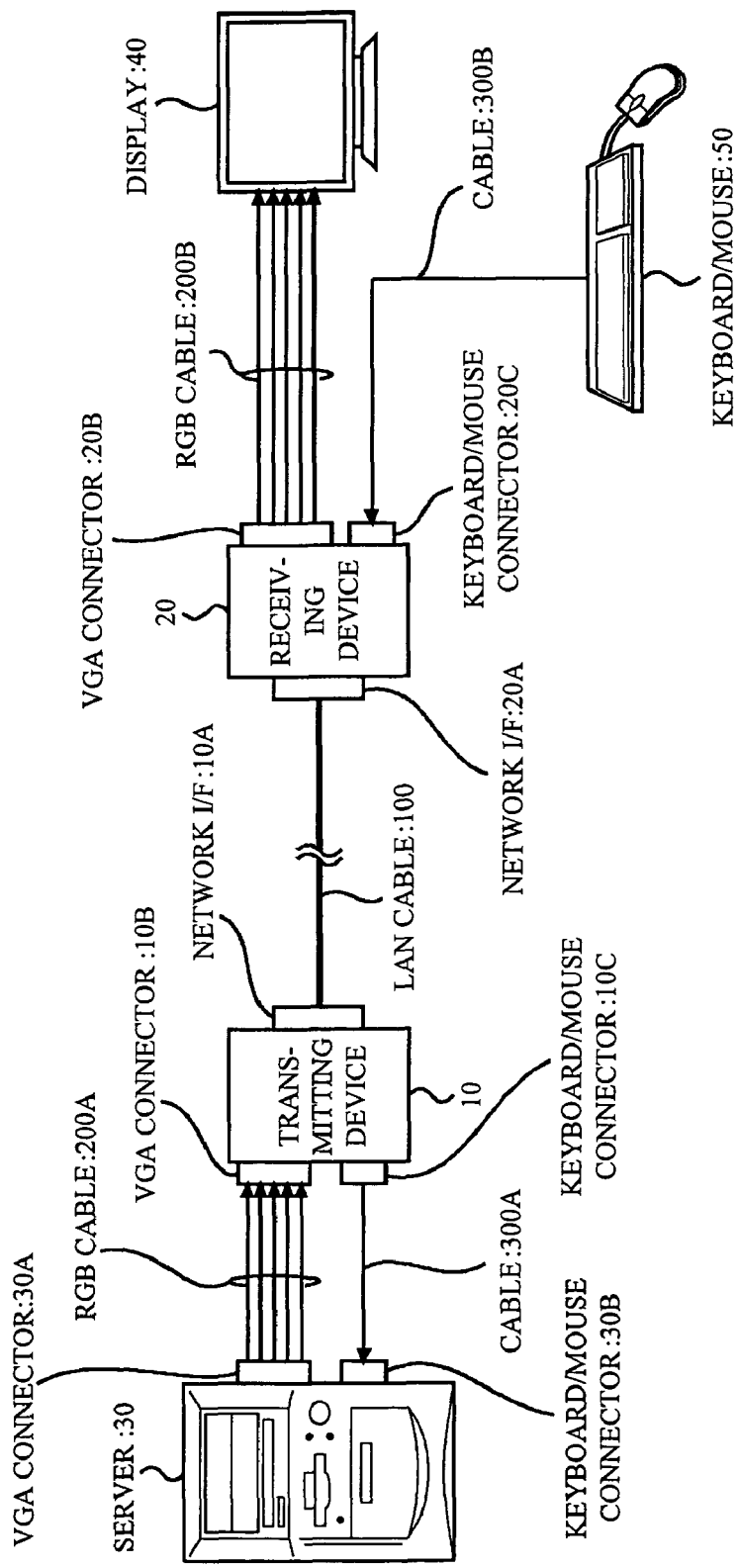
FIG. 1 is a block diagram showing the configuration of a signal transmission system according to a first embodiment of the present invention.

FIG. 1 is a block diagram showing the configuration of a signal transmission system according to a first embodiment of the present invention.

As shown in FIG. 1, in the signal transmission system, a transmitting device 10 and a receiving device 20 are provided between a server 30, and a display 40 and a keyboard, a mouse and so on (hereinafter referred to as a "keyboard/mouse") 50.

A transmitting device 10 and a receiving device 20 are connected to each other via a LAN cable 100. Network interfaces 10A and 20A (hereinafter referred to as "I/Fs") are incorporated into the transmitting device 10 and the receiving device 20, respectively. Any interfaces which have the configuration such that three video signals (RGB; a red signal, a green signal, and a blue signal, and hereinafter simply referred to as an "video signal" when any one of the three video signals may be designated), a horizontal synchronizing signal (Hsync), a vertical synchronizing signal (Vsync)(hereinafter simply referred to as a "synchronizing signal" when any one of the horizontal and vertical synchronizing signals may be designated), and a signal output from the keyboard/mouse 50 (hereinafter referred to as an "operation signal") can be transmitted or received can be applied to the network I/Fs 10A and 20A.

The LAN cable 100 is a Cat 5E straight cable, for example, and includes four pairs of signal lines (i.e., eight signal lines in total). Each of the video signals is transmitted from the transmitting device 10 to the receiving device 20 as differential signals, so that a pair of signal lines is occupied for each of the video signals. Therefore, three video signals, i.e., the RGB signals occupies three pairs of signal lines. A remaining pair of signal lines is used for transmitting the operation signal input from the keyboard/mouse 50 from the receiving device 20 to the transmitting device 10. As described later, the horizontal synchronizing signal is superimposed on the green signal and the vertical synchronizing signal is superimposed on the blue signal, and hence neither the horizontal synchronizing signal nor the vertical synchronizing signal independently occupy the signal line.

The transmitting device 10 has a VGB (Video graphics array) connector 10B as a display connector which inputs the video signals (RGB), the horizontal synchronizing signal, and the vertical synchronizing signal from the server 30 composed of an information processing apparatus such as a personal computer, a work station. For example, a general connector such as a BNC connector, or a D-sub 15 pins connector can be used as the VGA connector 10B.

The transmitting device 10 has a keyboard/mouse connector 10C which inputs the operation signal of the keyboard/mouse 50 input via the receiving device 20 to the server 30. A connector used for the connection of a general keyboard and a general mouse such as a PS/2 connector, a USB (Universal serial Bus) connector, and other serial connector can be used as the keyboard/mouse connector 10C.

Similarly to the general information processing apparatus, a VGA connector 30A outputting the video signals (RGB) and a keyboard/mouse connector 30B inputting the operation signal from the keyboard/mouse 50 are provided in the server 30. Therefore, the VGA connector 10B provided on the surface of a housing of the transmitting device 10 is connected to the VGA connector 30A provided on the surface of a housing of the server 30 with an RGB cable 200A composed of, for example, the BNC cable, the D-sub 15 pins cable, or the like. Similarly, the keyboard/mouse connector 10C provided on the surface of the housing of the transmitting device 10 is connected to the VGA connector 30B provided on the surface of the housing of the server 30 with a cable 300A used for the connection of a general keyboard and a general mouse such as a PS/2 cable, a USB cable, and other serial cable.

The receiving device 20 has a VGA connector 20B as a display connector which outputs the video signals (RGB), the horizontal synchronizing signal, and the vertical synchronizing signal to the display 40. For example, the general connector such as the BNC connector, or the D-sub 15 pins connector can be used as the VGA connector 20B. An RGB cable 200B provided on the display 40 is connected to the VGA connector 20B. The RGB cable 200B is composed of, for example, the BNC cable, the D-sub 15 pins cable, or the like.

The receiving device 20 has a keyboard/mouse connector 20C inputting the operation signal output from the keyboard/mouse 50. A connector used for the connection of the general keyboard and the general mouse such as the PS/2 connector, the USB connector, and other serial connector can be used as the keyboard/mouse connector 20C. A cable 300B provided on the keyboard/mouse 50 is connected to the keyboard/mouse connector 20C. The cable 300B is composed of a cable used for the connection of the general keyboard and the general mouse such as the PS/2 cable, the USB cable, and other serial cable.

Next, the internal configuration of the transmitting device 10 and the receiving device 20 will be described in detail with reference to the drawings. In the following description, a description will be given of an example of the case where the horizontal synchronizing signal is superimposed on the video signal (G) among the RGB video signals, and the vertical synchronizing signal is superimposed on the video signal (B).

FIG. 2 is a block diagram showing the internal configuration of the transmitting device 10. As shown in FIG. 2, the transmitting device 10 has a synchronizing signal/video signal superimposition circuit 11 a that superimposes the horizontal synchronizing signal on the video signal (G) among the RGB video signals input from the VGA connector 10B, and a synchronizing signal/video signal superimposition circuit 11b that superimposes the vertical synchronizing signal on the video signal (B) among the RGB video signals input from the VGA connector 10B.

The synchronizing signal/video signal superimposition circuit 11a inputs the video signal (G) among the RGB video signals. The synchronizing signal/video signal superimposition circuit 11a also inputs the horizontal synchronizing signal. Further, the midpoint potential (DC) is always applied to the synchronizing signal/video signal superimposition circuit 11*a*. Similarly, the synchronizing signal/video signal superimposition circuit 11*b* inputs the video signal (G) among the RGB video signals. The synchronizing signal/video signal superimposition circuit 11*b* also inputs the vertical synchronizing signal. Further, the midpoint potential (DC) is always applied to the synchronizing signal/video signal superimposition circuit 11*b*. The voltage level of the video signals (RGB) is about 1 V even if it is high, and the voltage level of the synchronizing signals is about 5 V equal with the internal voltage level. The midpoint potential (DC) is set to a value larger than the voltage level of the video signals, and set to a value lower than the voltage level of the synchronizing signals. In the present embodiment, the midpoint potential (DC) is about 2.5 V.

The operation of the synchronizing signal/video signal superimposition circuits 11*a* and 11*b* will be described in detail with reference to FIG. 3. It should be noted that the configuration and the operation of the synchronizing signal/video signal superimposition circuits 11*a* and 11*b* are similar to each other, and a description therefore will be given of only the configuration and the operation of the synchronizing signal/video signal superimposition circuit 11*a*. FIG. 3A shows waveforms of the horizontal synchronizing signal, a video signal (G), and the midpoint potential before superimposition, and FIG. 3B shows a waveform of an superimposed signal after the horizontal synchronizing signal is superimposed on the video signal (G).

The synchronizing signal/video signal superimposition circuit 11*a* includes a multiplexer. The horizontal synchronizing signal is used as a switch signal which switches the output of the multiplexer. The synchronizing signal/video signal superimposition circuit 11*a* selects the middle potential as an output for a time period when the horizontal synchronizing signal is input, as shown in FIG. 3A, and selects and outputs the video signal (G) for a time period excluding the above-mentioned time period. As a result, as shown in FIG. 3B, it is possible to obtain the superimposed signal in which the horizontal synchronizing signal, the voltage level of which becomes 2.5 V, is superimposed on the video signal (G).

Although in the present embodiment, the horizontal and vertical synchronizing signals are superimposed on the video signals (G) and (B) other than the video signal (R), respectively, the present embodiment is limited to this, and the horizontal and vertical synchronizing signals may be superimposed on any two of the video signals (RGB).

The video signal (R), the superimposed signal generated by the video signal (G) and the horizontal synchronizing signal, and the superimposed signal generated by the video signal (B) and the vertical synchronizing signal obtained as mentioned above are input to the network I/F 10A. The network I/F 10A assigns each of the input signals to any preset signal lines (i.e., a pair of signal lines) in the LAN cable 100, and transmits each of the input signals to the receiving device 20.

Figure 4:
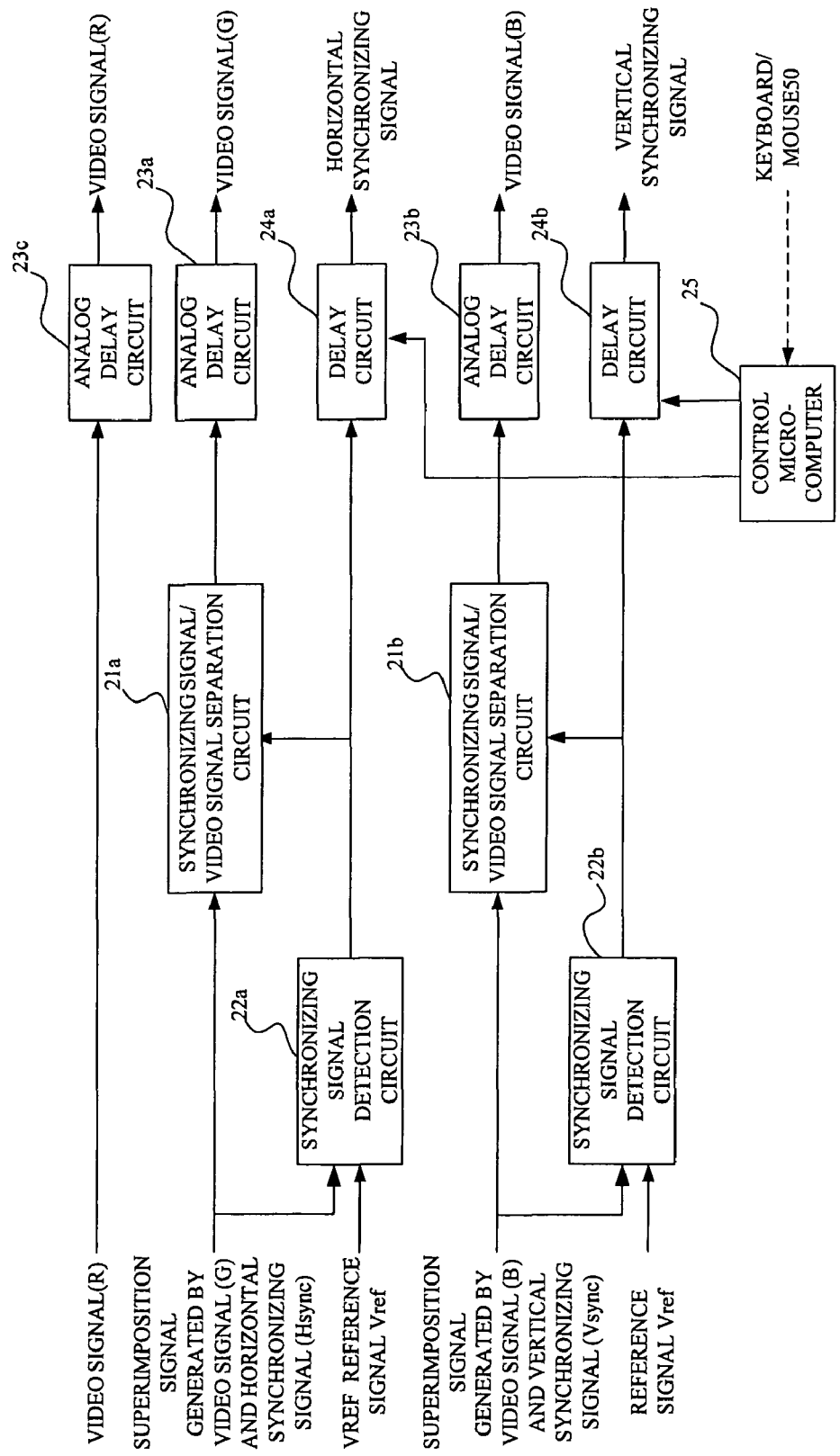
FIG. 4 is a block diagram showing the internal configuration of a receiving device 20.

FIG. 4 is a block diagram showing the internal configuration of the receiving device 20. As shown in FIG. 4, the receiving device 20 includes: synchronizing signal/video signal separation circuits 21*a* and 21*b* that respectively separate the superimposed signal generated by the video signal (G) and the horizontal synchronizing signal into the video signal (G) and the horizontal synchronizing signal, and the superimposed signal generated by the video signal (B) and the vertical synchronizing signal into the video signal (B) and the vertical synchronizing signal, among the signals received with the network I/F 20A; synchronizing signal detection circuits 22*a* and 22*b* that detect and the horizontal synchronizing signal and the vertical synchronizing signal, respectively; analog delay circuits 23*a*, 23*b* and 23*c* that adjust time amounts of delay of the video signal (G), the video signal (B), and the video signal (R), respectively; delay circuits 24*a* and 24*b* that adjust amounts of delay (specifically, delay time) of the horizontal synchronizing signal and the vertical synchronizing signal, respectively; a control microcomputer 25 that controls the amounts of delay (specifically, delay time) of the delay circuits 24*a* and 24*b*. Since the analog delay circuits 23*a*, 23*b*, and 23*c* pass the video signals, the analog delay circuits 23*a*, 23*b*, and 23*c* are composed of circuits with good transmission characteristics of the high frequency band, especially. On the contrary, the delay circuits 24*a* and 24*b* need not pass the video signals, and therefore can be composed of an inexpensive element.

The synchronizing signal/video signal separation circuits 21*a* and 21*b*, and the synchronizing signal detection circuits 22*a* and 22*b* may be composed of a single IC (integrated circuit) chip. The analog delay circuits 23*a*, 23*b* and 23*c* also may be composed of a single IC chip.

Figure 5:
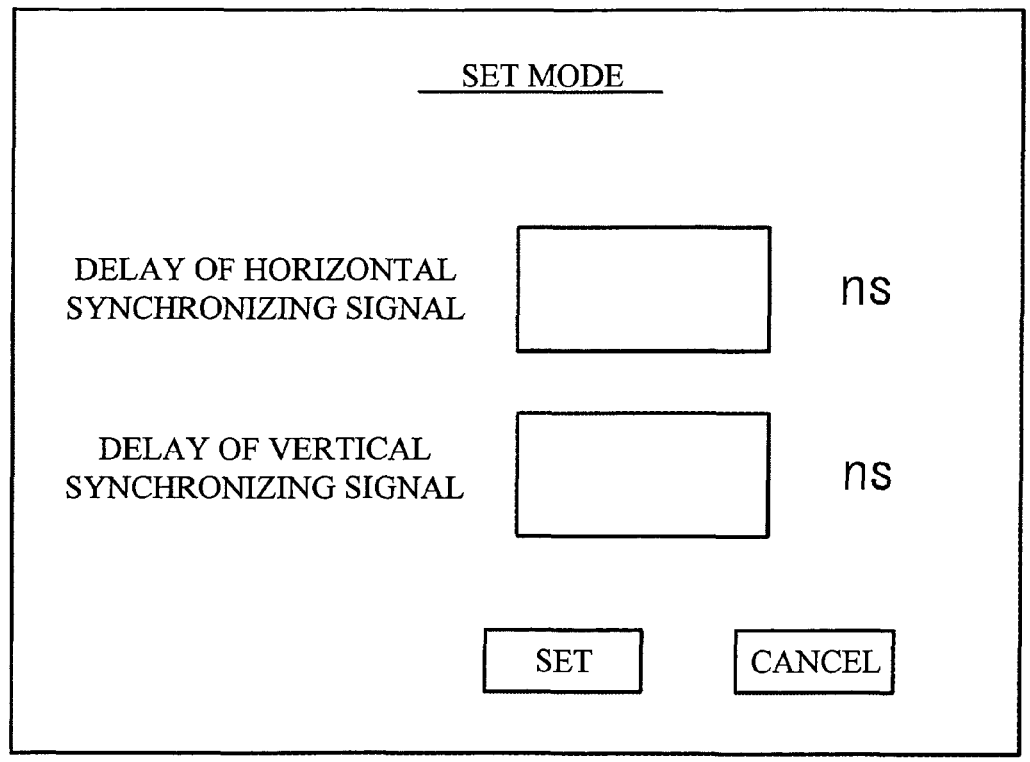
FIG. 5 is a diagram showing an example of a user interface.

When a user inputs a combination of certain particular keys (e.g., an F1key and an Enter key) from the keyboard/mouse 50 to the receiving device 20, a present mode is transferred to a set mode of the amounts of delay of the delay circuits 24*a* and 24*b* (specifically, delay time). The user operates a cursor key, a "+" key, and a "−" key of the keyboard, or a scroll button of the mouse in a state of the set mode to input the amounts of delay of the delay circuits 24*a* and 24*b*. Otherwise, when the present mode is transferred to the state of the set mode, the display 40 displays a user interface shown in FIG. 5. The user inputs the amounts of delay of the delay circuits 24*a* and 24*b* on the user interface. The control microcomputer 25 sets the amounts of delay of the delay circuits 24*a* and 24*b* input from the keyboard/mouse 50 to the delay circuits 24*a* and 24*b*.

The superimposed signal generated by the video signal (G) and the horizontal synchronizing signal is input to the synchronizing signal/video signal separation circuit 21*a* and the synchronizing signal detection circuit 22*a*. Also, a reference signal Vref is input to the synchronizing signal detection circuit 22*a*. The reference signal Vref is set to a voltage level which is lower than the voltage level of the middle potential (DC) (i.e., voltage level on a reception side), and higher than the voltage level of the video signals. In the present embodiment, the voltage level of the reference signal Vref is 2.0 V, for example. Similarly, the superimposed signal generated by the video signal (B) and the vertical synchronizing signal is input to the synchronizing signal/video signal separation circuit 21*b* and the synchronizing signal detection circuit 22*b*. Also, the above-mentioned reference signal Vref is input to the synchronizing signal detection circuit 22*b*. It should be noted that the configuration and the operation of the synchronizing signal/video signal separation circuits 21*a* and 21*b*, and the synchronizing signal detection circuits 22*a* and 22*b* are similar to each other, respectively, and a description therefore will be given of only the configuration and the operation of the synchronizing signal/video signal separation circuit 21*a* and the synchronizing signal detection circuit 22*a*.

Figure 6A:
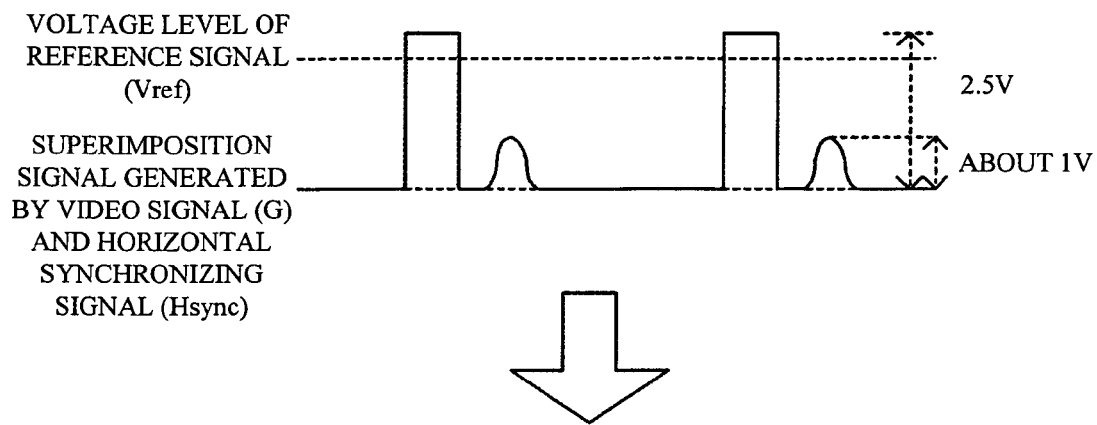
FIG. 6A is a diagram showing a waveform of an superimposed signal generated by the video signal (G) and the horizontal synchronizing signal.
Figure 6B:
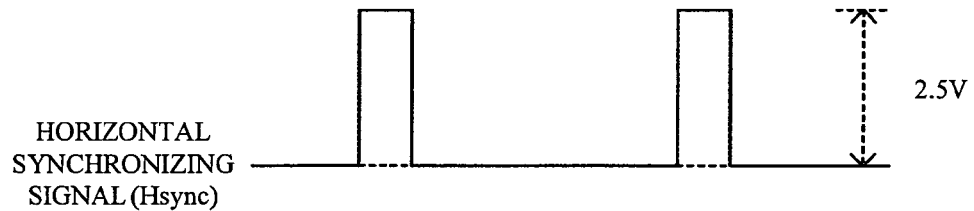
FIG. 6B is a diagram showing a waveform of the horizontal synchronizing signal after separation.

The synchronizing signal detection circuit 22*a* includes a comparator, not shown. The synchronizing signal detection circuit 22*a* sets the input reference signal Vref to a trigger level. Therefore, as shown in FIG. 6A, the horizontal synchronizing signal is output for a period when the voltage level of the input superimposed signal generated by the video signal (G) and the horizontal synchronizing signal exceeds the voltage level of the Vref (see FIG. 6B). The output horizontal synchronizing signal is input to the delay circuit 24*a* and the synchronizing signal/video signal separation circuit 21*a*.

Figure 7A:
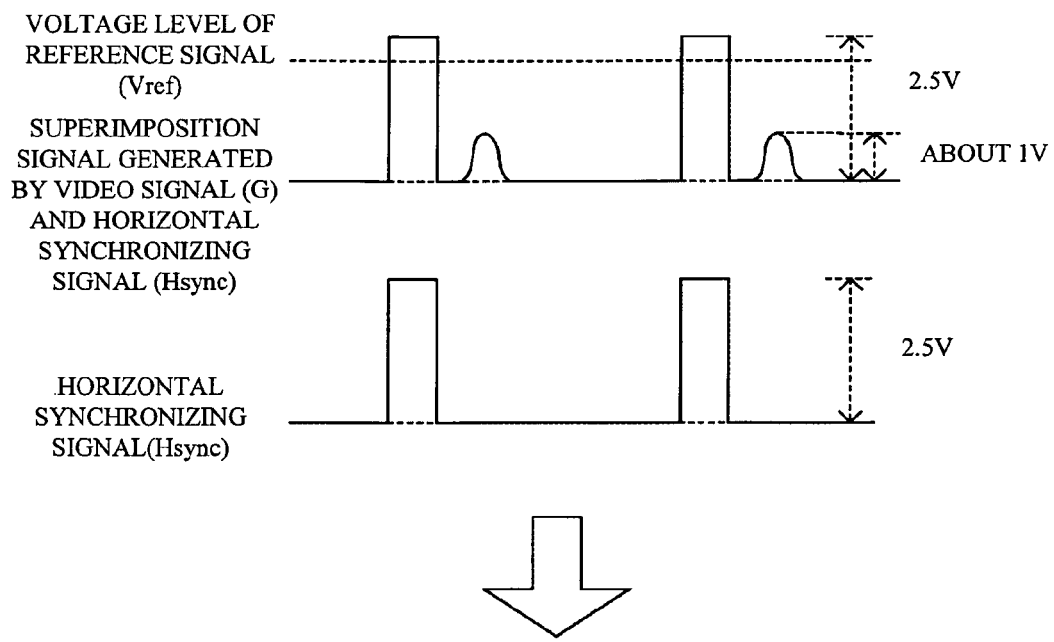
FIG. 7A is a diagram showing the waveform of the superimposed signal generated by the video signal (G) and the horizontal synchronizing signal, and the waveform of the horizontal synchronizing signal.
Figure 7B:
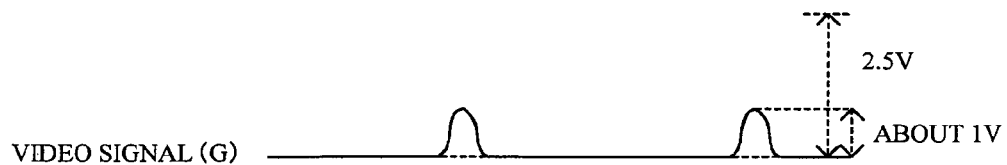
FIG. 7B is a diagram showing a waveform of the video signal (G) after separation.

The synchronizing signal/video signal separation circuit 21a includes a multiplexer, not shown. The horizontal synchronizing signal detected with the synchronizing signal detection circuit 22a is used as a switch signal for switching an output of the multiplexer. When the horizontal synchronizing signal is input as shown in FIG. 7A, the synchronizing signal/video signal separation circuit 21a selects a ground potential as output. When the horizontal synchronizing signal is not input, the synchronizing signal/video signal separation circuit 21a selects the superimposed signal generated by the video signal (G) and the horizontal synchronizing signal, and extracts and outputs only the video signal (G) (see FIG. 7B).

As described above, among the separated video signals (G) and (B), the horizontal synchronizing signal, and the vertical synchronizing signal, the video signals (G) and (B) are input to the analog delay circuits 23a and 23b, respectively. It should be noted that the configuration and the operation of the analog delay circuits 23a, 23b and 23c are similar to each other, and a description therefore will be given of only the configuration and the operation of the analog delay circuit 23a.

Figure 8:
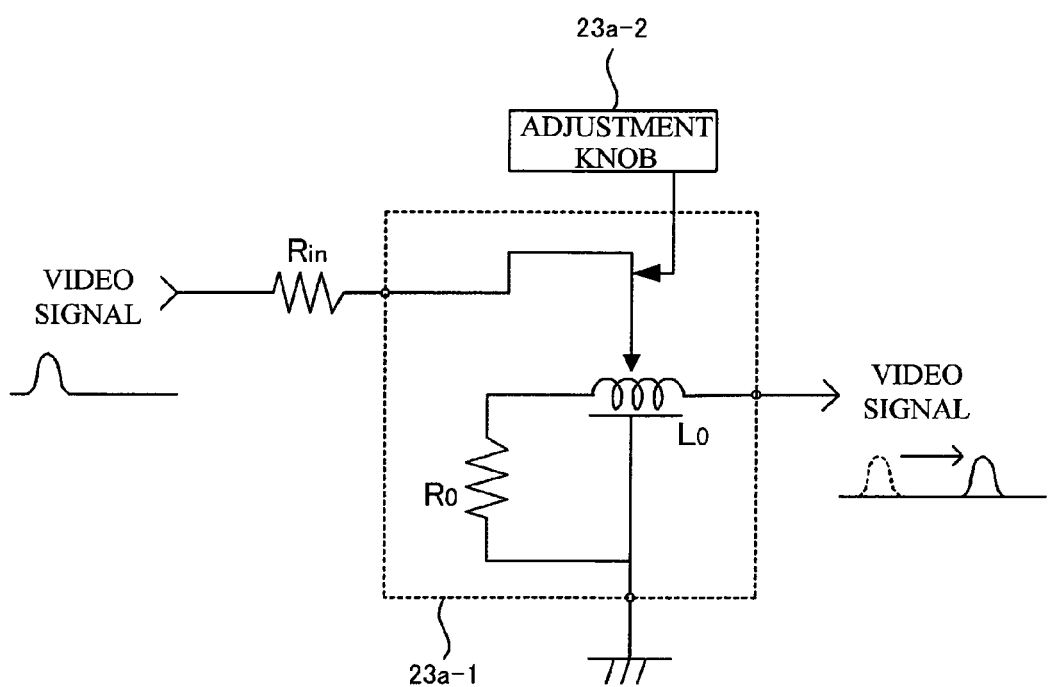

The analog delay circuit 23a has a delay element 23a-1 as shown in FIG. 8. The delay element 23a-1 has a variable impedance L0, and a resistance R0 connected in series thereto. Other end of the resistance R0 is grounded. An impedance adjustment mechanism of the variable impedance L0 is coupled with an adjustment knob 23a-2 outside the delay element 23a-1. Therefore, the user operates the adjustment knob 23a-2, so that an amount of delay by the delay element 23a-1 can be adjusted. An input matching resistance Rin is provided in an input step of the delay element 23a-1, and impedance matching is attempted.

Figure 9:
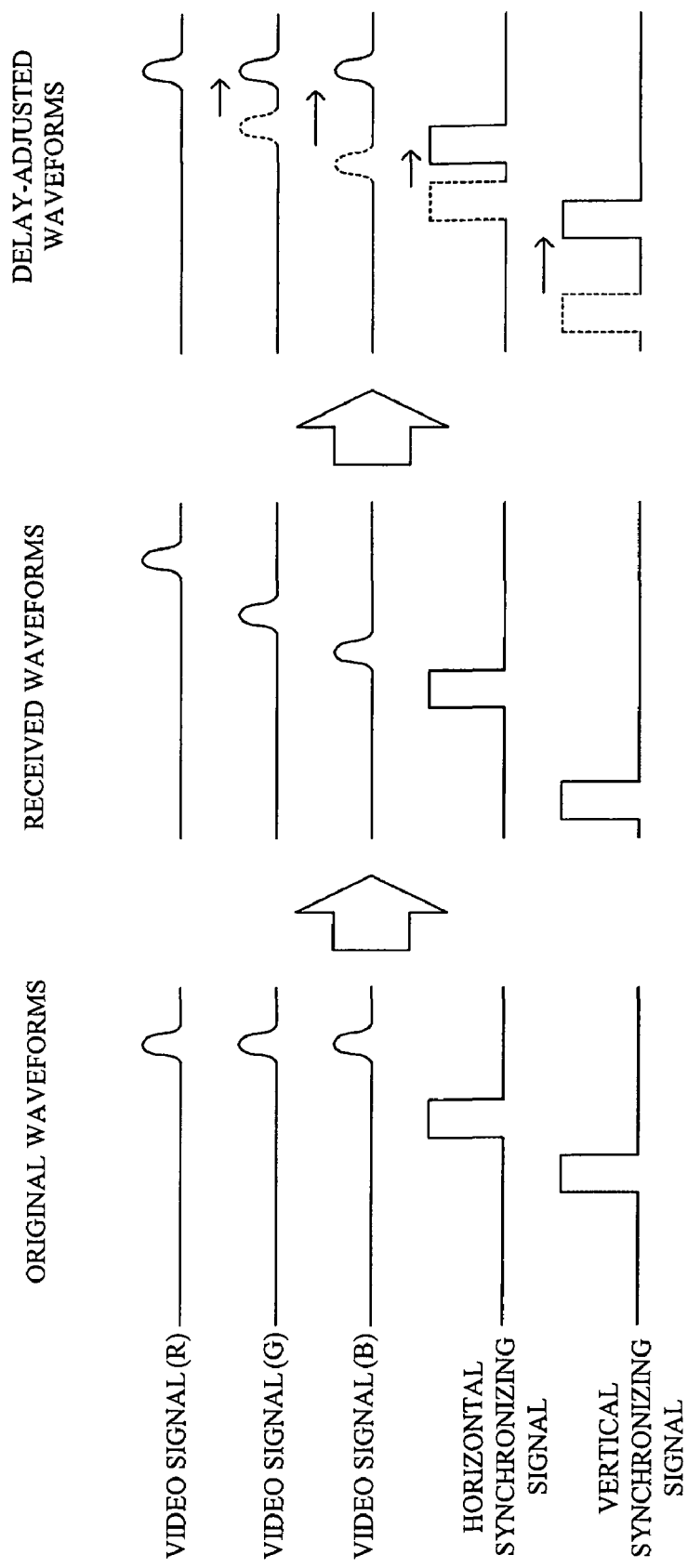
FIG. 9 is a diagram showing a condition where amounts of delay of RGB signals, the horizontal synchronizing signal, and a vertical synchronizing signal are adjusted.

An amount of delay of each of the video signals (RGB) is adjusted with the analog delay circuits 23a, 23b, and 23c as described above, so that the video signals can be synchronized with each other even when differences between amounts of delay of the video signals (RGB) (i.e., differences between pieces of delay time) exist as shown in FIG. 9. Further, as described above, the amounts of delay of the delay circuits 24a and 24b are input from the keyboard/mouse 50, so that the delay of the horizontal synchronizing signal and vertical synchronizing signal can be eliminated. At this time, the amounts of delay of the delay circuits 24a and 24b are input from the keyboard/mouse 50 so that the amount of delay of the delay circuit 24a is identical with the amount of delay adjusted with the analog delay circuit 23a, and the amount of delay of the delay circuit 24b is identical with the amount of delay adjusted with the analog delay circuit 23b. This is because the horizontal synchronizing signal is superimposed on the video signal (G), and hence the amounts of delay of the horizontal synchronizing signal and the video signal (G) to the video signal (R) are identical with each other. Similarly, this is because the vertical synchronizing signal is superimposed on the video signal (B), and hence the amounts of delay of the vertical synchronizing signal and the video signal (B) to the video signal (R) are identical with each other.

The video signals in which the amounts of delay are adjusted via the analog delay circuits 23a, 23b, and 23c, and the horizontal synchronizing signal and vertical synchronizing signal in which the amounts of delay are adjusted via the delay circuits 24a and 24b are output to the display 40, and an image, a video, or the like are displayed.

As described in detail above, according to the present embodiment, each of the synchronizing signal/video signal superimposition circuits 11a and 11b in the transmitting device 10 superimposes a synchronizing signal on at least one video signal among a plurality of video signals, and outputs the synchronizing signal and the video signal as the superimposed signal to the receiving device 20. Each of the synchronizing signal/video signal separation circuits 21a and 21b in the receiving device 20 separates the synchronizing signal and the video signal included in the superimposed signal into the synchronizing signal and the video signal. Each of the analog delay circuits 23a and 23b adjusts the amount of delay of the separated video signal to other video signals. The control microcomputer 25 and the delay circuit 24a or 24b controls the amount of delay of the separated synchronizing signal. Therefore, not only the amount of delay of the video signal but also the amount of delay of the synchronizing signal is adjusted, and hence a proper image can be obtained even when the video signals are transmitted over a long distance.

Since the control microcomputer 25 inputs the amount of delay of the separated synchronizing signal from the keyboard/mouse 50, the user can adjust the amount of delay of the separated synchronizing signal.

Although in the present embodiment, the control microcomputer 25 sets the amounts of delay of the delay circuits 24a and 24b with the amounts of delay input from the keyboard/mouse 50, when the amounts of delay of the delay circuit 24a and 24b are understood from the specifications of the LAN cable 100, the amounts of delay may be set to the respective delay circuit 24a and 24b in advance.

(Second Embodiment)

Figure 10:
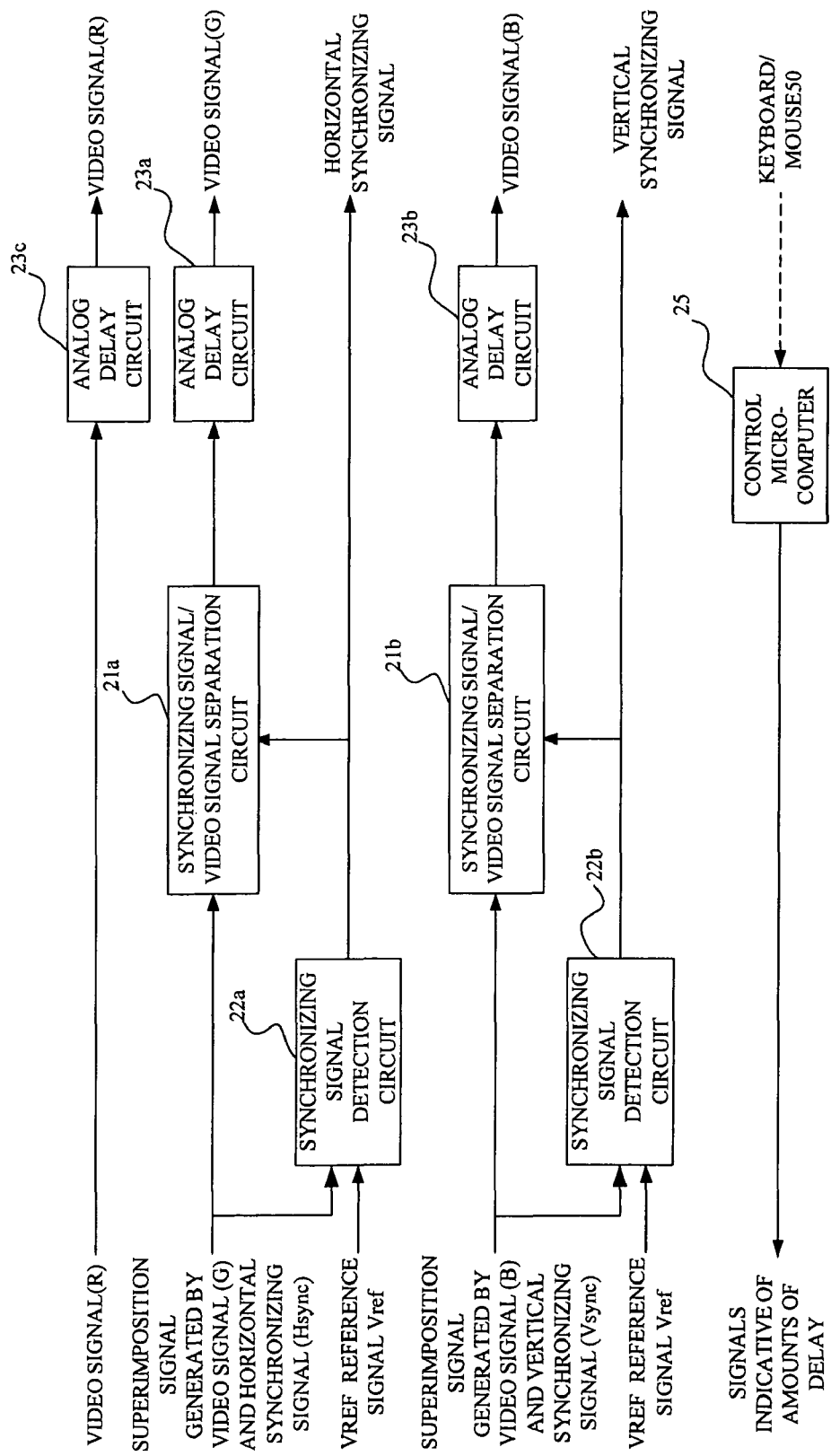
FIG. 10 is a block diagram showing the internal configuration of the receiving device 20 according to a second embodiment.
Figure 11:
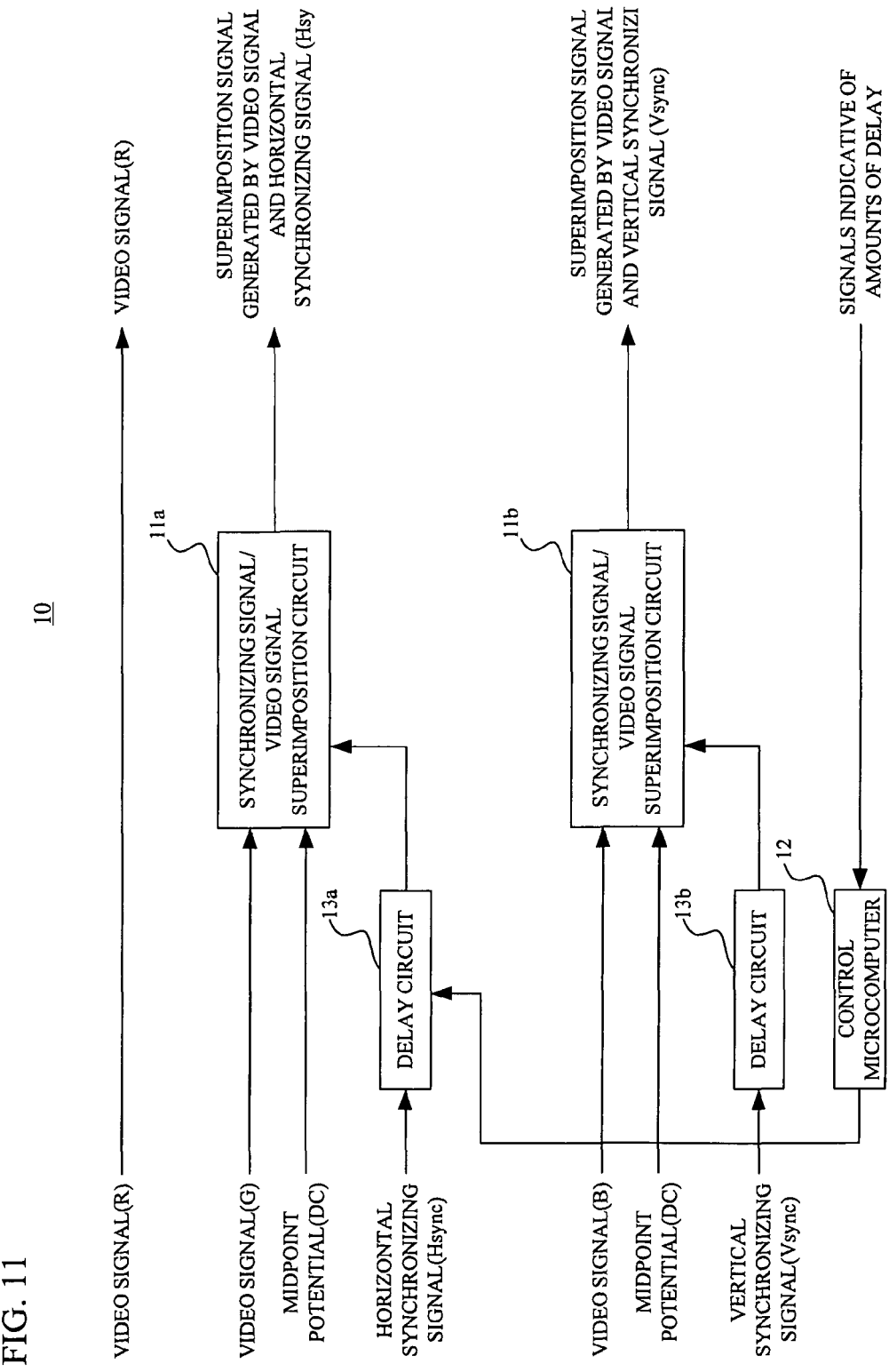
FIG. 11 is a block diagram showing the internal configuration of the transmitting device 10 according to a second embodiment.

FIG. 10 is a block diagram showing the internal configuration of the receiving device 20 according to a second embodiment, and FIG. 11 is a block diagram showing the internal configuration of the transmitting device 10 according to the second embodiment.

The same elements as the elements included in the receiving device 20 and the transmitting device 10 according to the first embodiment will be described by adding the same reference numerals thereto.

In the present embodiment, the amounts of delay of the horizontal synchronizing signal and the vertical synchronizing signal are adjusted with the transmitting device 10, unlike the first embodiment.

The receiving device 20 in FIG. 10 is different from the receiving 20 in FIG. 4 in that the receiving device 20 in FIG. 10 does not include the delay circuits 24a and 24b adjusting the amounts of delay of the horizontal synchronizing signal and the vertical synchronizing signal. Therefore, the control microcomputer 25 is not connected to the delay circuits 24a and 24b.

The transmitting device 10 in FIG. 11 is different from the transmitting device 10 in FIG. 2 in that the transmitting device 10 in FIG. 11 includes: a delay circuit 13a that adjusts the amount of delay of the horizontal synchronizing signal and is provided on an input path of the horizontal synchronizing signal of the synchronizing signal/video signal superimposition circuits 11a; a delay circuit 13b that adjusts the amount of delay of the vertical synchronizing signal and is provided on an input path of the vertical synchronizing signal of the synchronizing signal/video signal superimposition circuits 11b; and a control microcomputer 12 that controls the amounts of delay (specifically, delay time) of the delay circuits 13a and 13b.

A description therefore will be given of the operation of the receiving device 20 and the transmitting device 10 with reference to FIGS. 10 and 11.

When a user inputs a combination of certain particular keys (e.g., an F1 key and an Enter key) from the keyboard/mouse 50 to the receiving device 20, a present mode is transferred to a set mode of the amounts of delay of the delay circuits 13a and 13b (specifically, delay time). The user operates a cursor key, a "+" key, and a "−" key of the keyboard, or a scroll button of the mouse in a state of the set mode to input the amounts of delay of the delay circuits 13a and 13b. Otherwise, when the present mode is transferred to the state of the set mode, the display 40 displays a user interface shown in FIG. 5. The user inputs the amounts of delay of the delay circuits 13a and 13b on the user interface.

The control microcomputer 25 transmits signals indicative of the amounts of delay of the delay circuits 13a and 13b input from the keyboard/mouse 50 to the transmitting device 10.

The control microcomputer 12 in the transmitting device 10 receives the signals indicative of the amounts of delay of the delay circuits 13a and 13b from the control microcomputer 25, sets the signal indicative of the amount of delay of the delay circuit 13a to the delay circuit 13a, and sets the signal indicative of the amount of delay of the delay circuit 13b to the delay circuit 13b.

The delay circuit 13a delays the input horizontal synchronizing signal based on the set amount of delay, and outputs the delayed horizontal synchronizing signal to the synchronizing signal/video signal superimposition circuits 11a. The delay circuit 13b delays the input vertical synchronizing signal based on the set amount of delay, and outputs the delayed vertical synchronizing signal to the synchronizing signal/video signal superimposition circuits 11b.

The synchronizing signal/video signal superimposition circuits 11 a outputs the superimposed signal in which the delayed horizontal synchronizing signal is superimposed on the video signal (G) to the receiving device 20. The synchronizing signal/video signal superimposition circuits 11b outputs the superimposed signal in which the delayed vertical synchronizing signal is superimpose on the video signal (B) to the receiving device 20.

Then, in the receiving device 20, as described in the first embodiment, the superimposed signal in which the delayed horizontal synchronizing signal is superimposed on the video signal (G) is separated into the video signal (G) and the delayed horizontal synchronizing signal, and the superimposed signal in which the delayed vertical synchronizing signal is superimpose on the video signal (B) is separated into the video signal (B) and the delayed vertical synchronizing signal. As described in the first embodiment, the amounts of delay of the video signal (G) and the video signal (B) are adjusted with the analog delay circuits 23a and 23b, and the video signal (G) and the video signal (B) are synchronized with the video signal (R).

Since the amounts of delay of the horizontal synchronizing signal and the vertical synchronizing signal are previously adjusted, the horizontal synchronizing signal and the vertical synchronizing signal are directly output to the display 40.

As described in detail above, according to the present embodiment, each of the synchronizing signal/video signal separation circuits 21a and 21b in the receiving device 20 separates the synchronizing signal and the video signal included in the superimposed signal into the synchronizing signal and the video signal. Each of the analog delay circuits 23a and 23b adjusts the amount of delay of the separated video signal to other video signals. Each of the delay circuits 13a and 13b in the transmitting device 10 adjusts the amount of delay of the synchronizing signal before the synchronizing signal is transmitted to the receiving device 20. Each of the synchronizing signal/video signal superimposition circuits 11a and 11b superimposes the synchronizing signal having the amount of delay adjusted with each of the delay circuits 13a and 13b on the corresponding video signal included in the superimposed signal, and outputs them as a superimposed signal to the receiving device 20. Therefore, not only the amount of delay of the video signal but also the amount of delay of the synchronizing signal is adjusted, and hence a proper image can be obtained even when the video signals are transmitted over a long distance.

Although in the present embodiment, the control microcomputer 25 sets the amounts of delay of the delay circuits 13a and 13b with the amounts of delay input from the keyboard/mouse 50, when the amounts of delay of the delay circuit 13a and 13b are understood from the specifications of the LAN cable 100, the amounts of delay may be set to the respective delay circuit 13a and 13b in advance.

(Third Embodiment)

Figure 12:
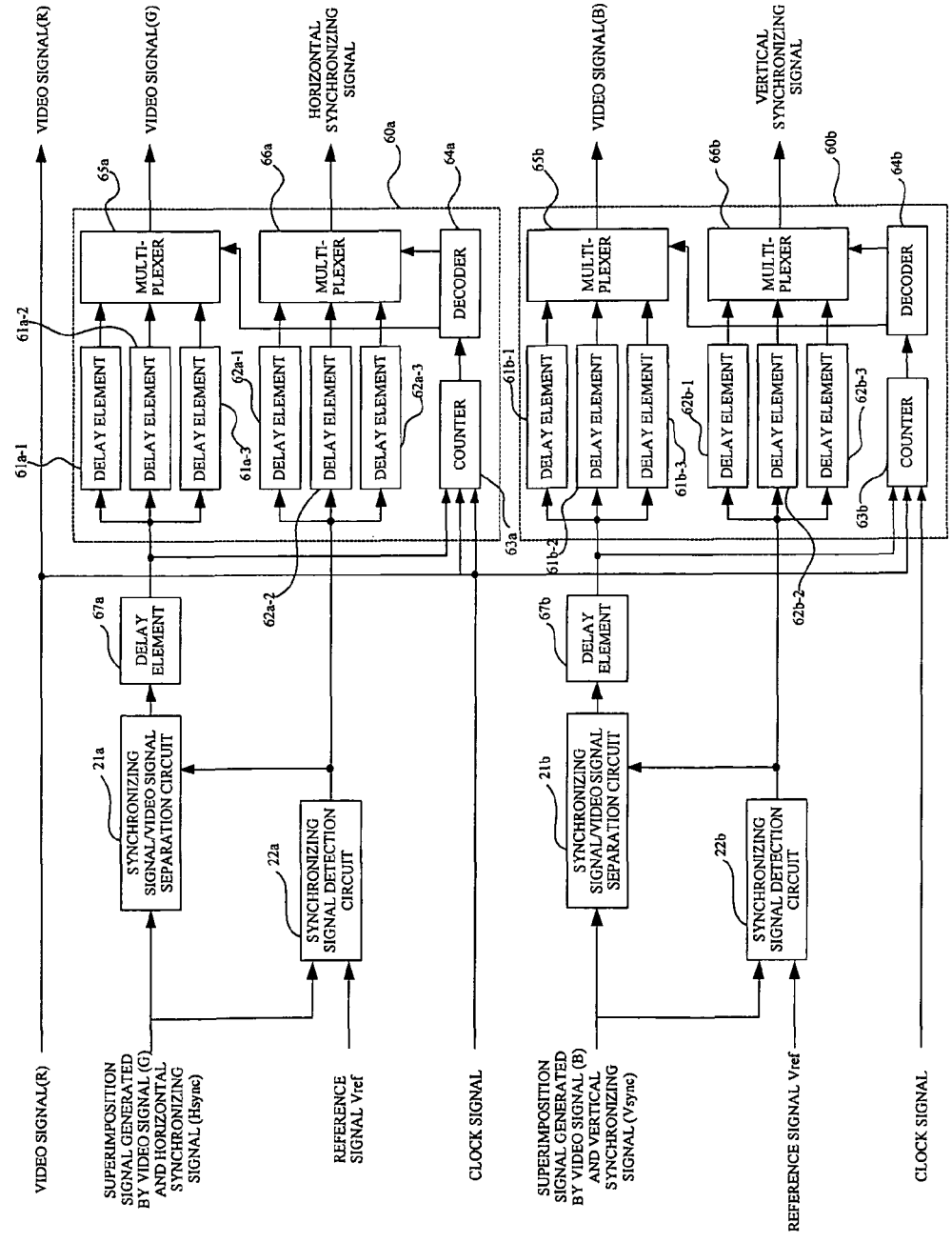
FIG. 12 is a block diagram showing the internal configuration of the receiving device 20 according to a third embodiment.

FIG. 12 is a block diagram showing the internal configuration of the receiving device 20 according to a third embodiment. The same elements as the elements included in the receiving device 20 according to the first embodiment will be described by adding the same reference numerals thereto.

In the present embodiment, the amounts of delay between the video signals and the amounts of delay of the horizontal synchronizing signal and the vertical synchronizing signal are automatically adjusted, unlike the first embodiment. To realize this, in the present embodiment, the analog delay circuit 23a and the delay circuit 24a according to the first embodiment are changed with a delay circuit 60a. Similarly, the analog delay circuit 23b and the delay circuit 24b are changed with a delay circuit 60b. It should be noted that the configuration and the operation of the delay circuits 60a and 60b are similar to each other, and a description therefore will be given of only the configuration and the operation of the delay circuit 60a.

The delay circuit 60a includes delay elements 61a-1, 61a-2 and 61a-3, delay elements 62a-1, 62a-2 and 62a-3, a counter 63a, a decoder 64a, and multiplexers 65a and 66a.

The video signal (R), the video signal (G) output from the synchronizing signal/video signal separation circuit 21a, and a clock signal having a given period are input to the counter 63a. When the video signal (R) is input to the counter 63a, the counter 63a starts counting up a count value. When the video signal (G) is input to the counter 63a, the counter 63a terminates counting up the count value. Then, the counter 63a inputs the count value at this time to the decoder 64a, and resets the count value. A delay element 67a which delays the video signal (G) more than a predicted difference between the amounts of delay of the video signal (G) and the video signal (R) is provided on an output side of the synchronizing signal/video signal separation circuit 21a, or an input side of the video signal (G) in the counter 63a so that the video signal (G) is input to the counter 63a in timing which is always later than the video signal (R). Therefore, the video signal (R) is always input to the counter 63a earlier than the video signal (G).

The video signal (G) output from the synchronizing signal/video signal separation circuit 21a is divergingly input to the plurality of delay elements 61a-1, 61a-2 and 61a-3 (e.g. three delay elements in FIG. 12) after passing through the above-mentioned delay element 67a. The amounts of delay of the delay elements 61a-1, 61a-2 and 61a-3 are different from each other. The output of each of the delay elements 61a-1, 61a-2 and 61a-3 is input to the multiplexer 65a.

The horizontal synchronizing signal detected with the synchronizing signal detection circuit 22a is divergingly input to the plurality of delay elements 62a-1, 62a-2 and 62a-3. Although the amounts of delay of the delay elements 62a-1, 62a-2 and 62a-3 are different from each other, the amounts of delay of the delay elements 62a-1, 62a-2 and 62a-3 are the same as those of the delay elements 61a-1, 61a-2 and 61a-3, respectively. For example, when the amounts of delay of the delay elements 61a-1, 61a-2 and 61a-3 are 10 ns, 20 ns, and 30 ns, respectively, the amounts of delay of the delay elements 62a-1, 62a-2 and 62a-3 are 10 ns, 20 ns, and 30 ns, respectively. The output of each of the delay elements 62a-1, 62a-2 and 62a-3 is input to the multiplexer 66a.

The decoder 64a decodes the count value input from the counter 63a, and inputs selection signal corresponding to a decoded value to the multiplexers 65a and 66a. Therefore, the multiplexer 65a selectively outputs the video signal (G) delayed with any one of the delay elements 61a-1, 61a-2 and 61a-3, based on the selection signal. Similarly, the multiplexer 66a selectively outputs the horizontal synchronizing signal delayed with any one of the delay elements 62a-1, 62a-2 and 62a-3, based on the selection signal. Since the selection signal input to the multiplexer 65a is the same as the selection signal input to the multiplexer 665a, a combination of delay elements having the same amount of delay is selected. That is, a selected pattern is any one of three types of a combination of the delay elements 61a-1 and 62a-1, a combination of the delay elements 61a-2 and 62a-2, and a combination of the delay elements 61a-3 and 62a-3.

Accordingly, it is possible to automatically select and output the video signal (G) and the horizontal synchronizing signal which have the most suitable amounts of delay. It should be noted that other components in the receiving device 20 are similar to the first embodiment except that adjustment knob 23a-2 and 23b-2 are omitted, and a description thereof is omitted.

As described in detail above, according to the present embodiment, each of the synchronizing signal/video signal superimposition circuits 11a and 11b in the transmitting device 10 superimposes a synchronizing signal on at least one video signal among a plurality of video signals, and outputs the synchronizing signal and the video signal as the superimposed signal to the receiving device 20. Each of the synchronizing signal/video signal separation circuits 21a and 21b in the receiving device 20 separates the synchronizing signal and the video signal included in the superimposed signal into the synchronizing signal and the video signal. The delay circuit 60a adjusts the amount of delay of the separated video signal to other video signals, and automatically adjusts the amount of delay of the separated synchronizing signal so as to be identical with the amount of delay of the separated video signal. Therefore, the amount of delay of the synchronizing signal is automatically adjusted so as to be identical with the amount of delay of the video signal, and hence a proper image can be obtained even when the video signals are transmitted over a long distance.

Also, the delay circuit 60a includes the plurality of delay elements 61a-1, 61a-2 and 61a-3 having the respective different amounts of delay, and the plurality of delay elements 62a-1, 62a-2 and 62a-3 having the same amounts of delay as the respective delay elements 61a-1, 61a-2 and 61a-3. The receiving device 20 includes the counter 63 that starts counting up the count value depending on the input of other video signal, and terminates counting up the count value depending on the input of the separated synchronizing signal, the decoder 64a that decodes the count value of the counter 63, and the multiplexers 65a and 66a that select the delay elements corresponding to the count value decoded with the decoder 64a from the plurality of delay elements 61a-1, 61a-2 and 61a-3, and delay elements 62a-1, 62a-2 and 62a-3, respectively.

Therefore, the amount of delay of the synchronizing signal is automatically adjusted with any one of the delay elements 62a-1, 62a-2 and 62a-3 which has the same amount of delay as a delay element selected from the delay elements 61a-1, 61a-2 and 61a-3 having the respective different amounts of delay, and hence a proper image can be obtained even when the video signals are transmitted over a long distance. The delay circuit 60b includes the same composition as the delay circuit 60a, and hence can obtain the same advantageous effects as the delay circuit 60a.

(Fourth Embodiment)

Figure 13:
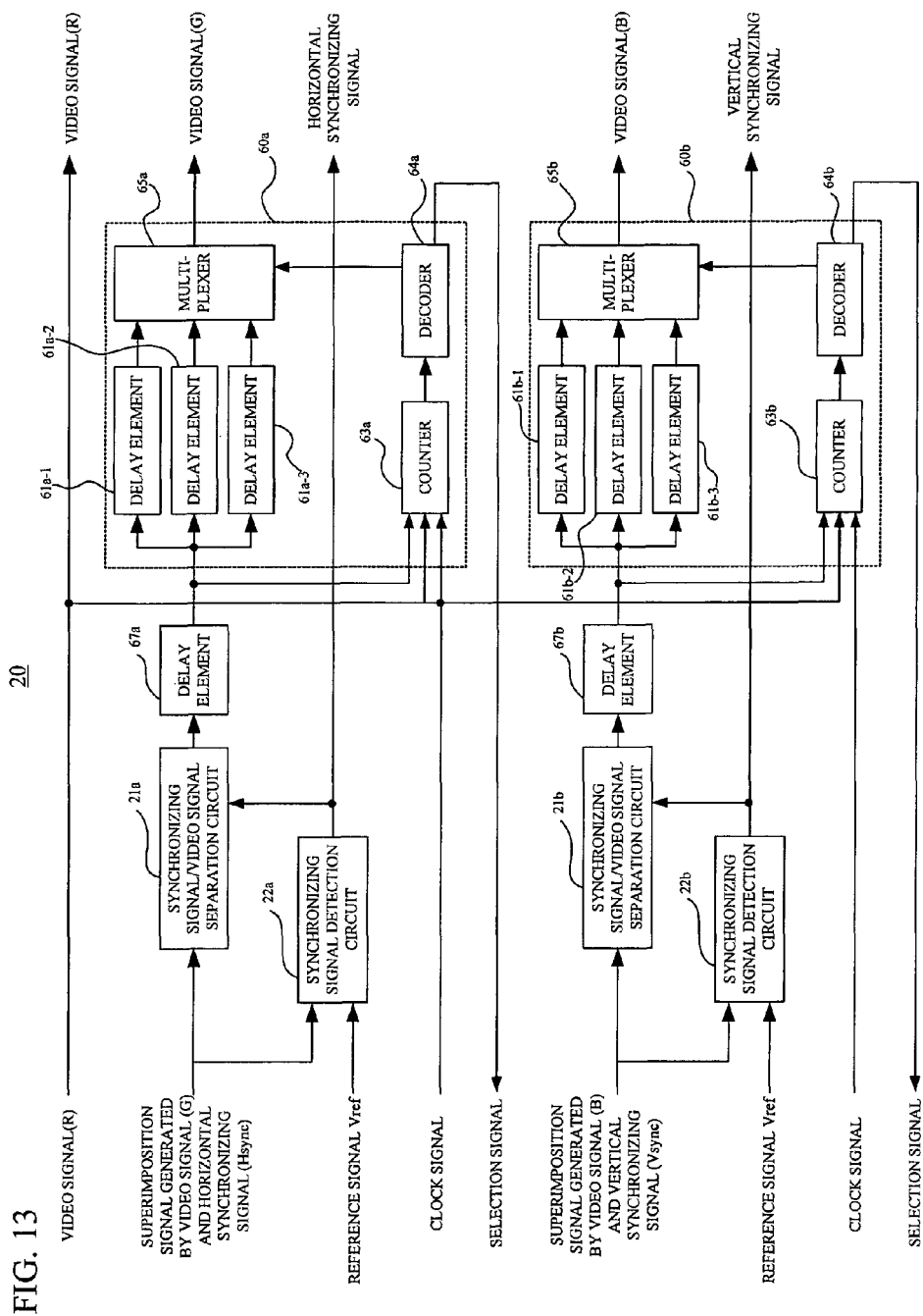
FIG. 13 is a block diagram showing the internal configuration of the receiving device 20 according to a fourth embodiment.
Figure 14:
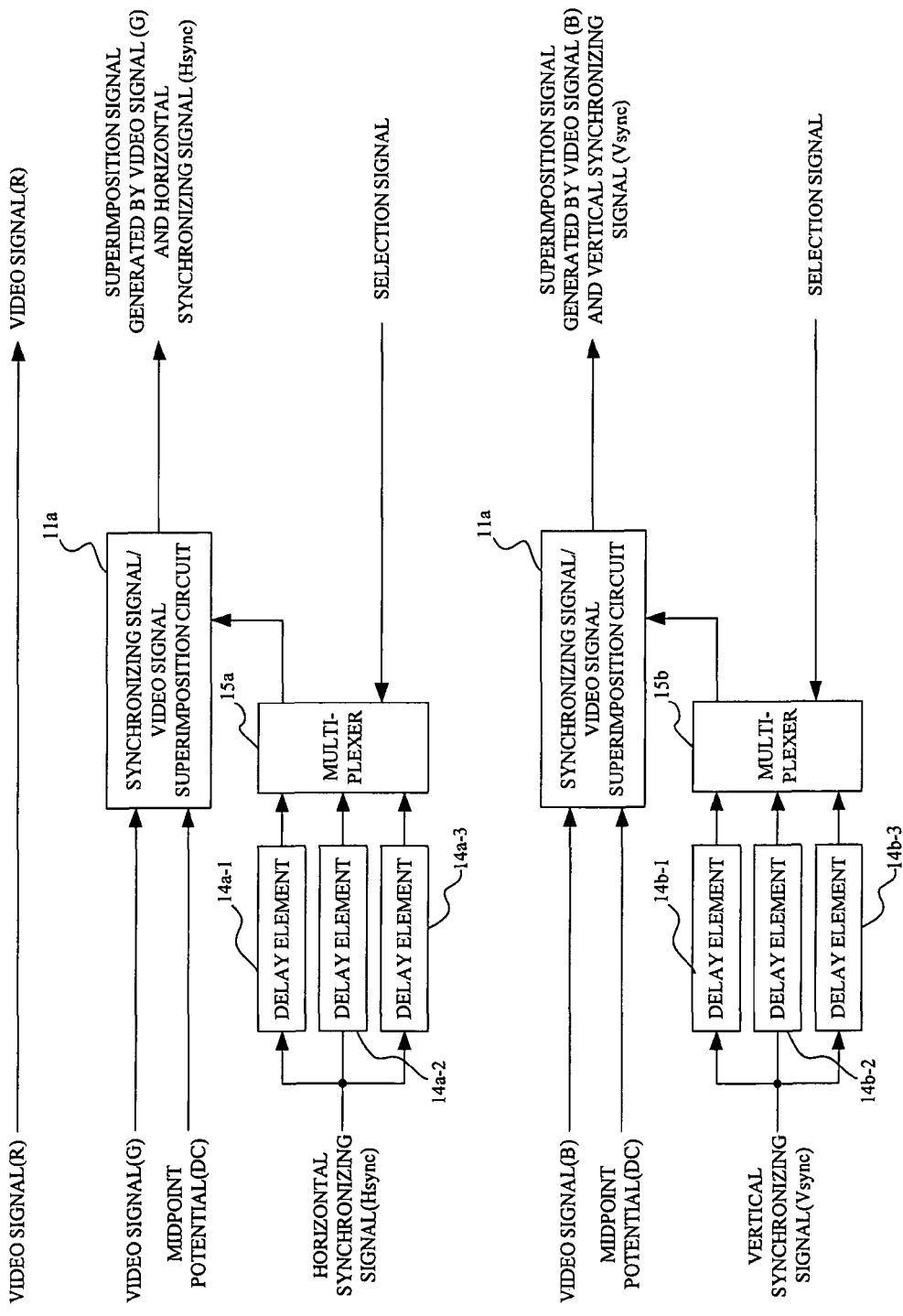
FIG. 14 is a block diagram showing the internal configuration of the transmitting device 10 according to a fourth embodiment.

FIG. 13 is a block diagram showing the internal configuration of the receiving device 20 according to a fourth embodiment, and FIG. 14 is a block diagram showing the internal configuration of the transmitting device 10 according to the fourth embodiment.

The same elements as the elements included in the receiving device 20 according to the third embodiment and the transmitting device 10 according to the first embodiment will be described by adding the same reference numerals thereto.

In the present embodiment, the receiving device 20 automatically adjusts the amounts of delay between the video signals, and the transmitting device 10 automatically adjusts the amounts of delay of the horizontal synchronizing signal and the vertical synchronizing signal, unlike the third embodiment.

The receiving device 20 in FIG. 13 is different from the receiving device 20 in FIG. 12 in that the receiving device 20 in FIG. 13 does not include the delay elements 62a-1, 62a-2, 62a-3, 62b-1, 62b-2 and 62b-3, and the multiplexers 66a and 66b.

The transmitting device 10 in FIG. 14 is different from the transmitting device 10 in FIG. 2 in that the transmitting device 10 in FIG. 14 includes a delay element 14a-1 having the same amount of delay as the delay element 61a-1, a delay element 14a-2 having the same amount of delay as the delay element 61a-2, a delay element 14a-3 having the same amount of delay as the delay element 61a-3, and a multiplexer 15a which are provided on a input path of the horizontal synchronizing signal of the synchronizing signal/video signal superimposition circuit 11a, and further includes a delay element 14b-1 having the same amount of delay as the delay element 61b-1, a delay element 14b-2 having the same amount of delay as the delay element 61b-2, a delay element 14b-3 having the same amount of delay as the delay element 61b-3, and a multiplexer 15b which are provided on a input path of the vertical synchronizing signal of the synchronizing signal/video signal superimposition circuit 11b.

Although a description therefore will be given of the operation of the receiving device 20 and the transmitting device 10 with reference to FIGS. 13 and 14, a description of the fourth embodiment similar to the descriptions of the first to third embodiments is omitted.

In the receiving device 20 in FIG. 13, the decoder 64a decodes a count value input from the counter 63a, inputs a selection signal corresponding to the decoded value to the multiplexer 65a, and outputs the selection signal to the multiplexer 15a of the transmitting device 10. The decoder 64b also decodes a count value input from the counter 63b, inputs a selection signal corresponding to the decoded value to the multiplexer 65b, and outputs the selection signal to the multiplexer 15b of the transmitting device 10.

In the transmitting device 10 in FIG. 14, the horizontal synchronizing signal is divergingly input to the plurality of delay elements 14a-1, 14a-2 and 14a-3. The amounts of delay of the delay elements 14a-1, 14a-2 and 14a-3 are different from each other. The multiplexer 15a selectively outputs the horizontal synchronizing signal delayed with any one of the delay elements 14a-1, 14a-2 and 14a-3 to the synchronizing signal/video signal superimposition circuit 11a, based on the selection signal output from the decoder 64a of the receiving device 20. The synchronizing signal/video signal superimposition circuit 11a outputs the superimposed signal in which the delayed horizontal synchronizing signal is superimposed on the video signal (G) to the receiving device 20.

The vertical synchronizing signal is divergingly input to the plurality of delay elements 14b-1, 14b-2 and 14b-3. The amounts of delay of the delay elements 14b-1, 14b-2 and 14b-3 are different from each other. The multiplexer 15b selectively outputs the vertical synchronizing signal delayed with any one of the delay elements 14b-1, 14b-2 and 14b-3 to the synchronizing signal/video signal superimposition circuit 11b, based on the selection signal output from the decoder 64b of the receiving device 20. The synchronizing signal/video signal superimposition circuit 11b outputs the superimposed signal in which the delayed vertical synchronizing signal is superimposed on the video signal (B) to the receiving device 20.

Then, in the receiving device 20, as described in the first embodiment, the superimposed signal in which the delayed horizontal synchronizing signal is superimposed on the video signal (G) is separated into the video signal (G) and the delayed horizontal synchronizing signal, and the superimposed signal in which the delayed vertical synchronizing signal is superimpose on the video signal (B) is separated into the video signal (B) and the delayed vertical synchronizing signal. As described in the third embodiment, the amount of delay of the video signal (G) is adjusted with any one of the delay elements 61a-1, 61a-2 and 61a-3, and the multiplexer 65a, and the amount of delay of the video signal (B) is adjusted with any one of the delay elements 61b-1, 61b-2 and 61b-3, and the multiplexer 65b. As a result, the video signal (G) and the video signal (B) are synchronized with the video signal (R).

Since the amounts of delay of the horizontal synchronizing signal and the vertical synchronizing signal are previously adjusted, the horizontal synchronizing signal and the vertical synchronizing signal are directly output to the display 40.

As described in detail above, according to the present embodiment, each of the synchronizing signal/video signal separation circuits 21a and 21b in the receiving device 20 separates the synchronizing signal and the video signal included in the superimposed signal into the synchronizing signal and the video signal. Each of the delay circuits 60a and 60b adjusts the amount of delay of the separated video signal to other video signals. Each of any one of the delay elements 14a-1, 14a-2 and 14a-3 and any one of the delay elements 14b-1, 14b-2 and 14b-3 in the transmitting device 10 adjusts the amount of delay of the synchronizing signal before the synchronizing signal is transmitted to the receiving device 20. Each of the synchronizing signal/video signal superimposition circuits 11a and 11b superimposes the synchronizing signal having the amount of delay adjusted with each of any one of the delay elements 14a-1, 14a-2 and 14a-3 and any one of the delay elements 14b-1, 14b-2 and 14b-3 on the corresponding video signal included in the superimposed signal, and outputs them as a superimposed signal to the receiving device 20. Therefore, not only the amount of delay of the video signal but also the amount of delay of the synchronizing signal is adjusted, and hence a proper image can be obtained even when the video signals are transmitted over a long distance.

Also, the delay circuit 60a includes the plurality of delay elements 61a-1, 61a-2 and 61a-3 having the respective different amounts of delay. The receiving device 20 includes the counter 63 that starts counting up the count value depending on the input of other video signal, and terminates counting up the count value depending on the input of the separated synchronizing signal, the decoder 64a that decodes the count value of the counter 63, and the multiplexer 65a that selects the delay element corresponding to the count value decoded with the decoder 64a from the plurality of delay elements 61a-1, 61a-2 and 61a-3. The transmitting device 10 includes the plurality of delay elements 14a-1, 14a-2 and 14a-3 having the same amounts of delay as the delay elements 61a-1, 61a-2 and 61a-3, respectively, and the multiplexer 15a that selects the delay element corresponding to the count value decoded with the decoder 64a from the plurality of delay elements 14a-1, 14a-2 and 14a-3.

Therefore, the amount of delay of the synchronizing signal is automatically adjusted with any one of the delay elements 14a-1, 14a-2 and 14a-3 which has the same amount of delay as a delay element selected from the delay elements 61a-1, 61a-2 and 61a-3 having the respective different amounts of delay, and hence a proper image can be obtained even when the video signals are transmitted over a long distance. The delay circuit 60b includes the same composition as the delay circuit 60a, and hence can obtain the same advantageous effects as the delay circuit 60a.

Although in the first to fourth embodiments, the horizontal synchronizing signal and the vertical synchronizing signal are superimposed on the video signals (G) and (B), respectively, a composite-type synchronizing signal in which the horizontal synchronizing signal and the vertical synchronizing signal are synthesized in one may be used. In this case, the composite-type synchronizing signal is superimposed on the video signal (G), for example. Thus, when the composite-type synchronizing signal is used, the superimposition circuit, the separation circuit, the detection circuit, the delay circuit, and the like are sufficient one by one for the signal transmission system, thereby making the transmitting device 10 and the receiving device 20 compact and reducing manufacturing costs.

Finally, several aspects of the present invention are summarized below.

According to a first aspect of the present invention, there is provided a signal transmission system having a transmitting device including a superimposition portion that superimposes at least one synchronizing signal on at least one video signal among a plurality of video signals, and outputs the synchronizing signal and the video signal as a superimposition signal to a receiving device; and the receiving device including a separation portion that separates the superimposition signal into the synchronizing signal and the video signal; a first adjustment portion that adjusts an amount of delay of the separated video signal to another video signal; and a second adjustment portion that adjusts an amount of delay of the separated synchronizing signal.

With the above configuration, not only the amount of delay of the video signal but also the amount of delay of the synchronizing signal is adjusted, and hence a proper image can be obtained even when the video signals are transmitted over a long distance.

The superimposition portion corresponds to synchronizing signal/video signal superimposition circuits 11a and 11b in FIG. 2. The separation portion corresponds to synchronizing signal/video signal separation circuits 21a and 21b in FIG. 4. The first adjustment portion corresponds to analog delay circuits 23a and 23b in FIG. 4. The second adjustment portion corresponds to a control microcomputer 25 and delay circuits 24a and 24b in FIG. 4. The first adjustment portion may correspond to delay elements 61a-1, 61a-2 and 61a-3, and a multiplexer 65a, or delay elements 61b-1, 61b-2 and 61b-3, and a multiplexer 65b in FIG. 12. The second adjustment portion may correspond to delay elements 62a-1, 62a-2 and 62a-3, and a multiplexer 66a, or delay elements 62b-1, 62b-2 and 62b-3, and a multiplexer 66b in FIG. 12.

Preferably, the second adjustment portion includes an input portion that inputs the amount of delay of the separated synchronizing signal.

With the above configuration, a user can adjust the amount of delay of the separated synchronizing signal. The input portion corresponds to the control microcomputer 25 in FIG. 4.

Preferably, the second adjustment portion automatically adjusts the amount of delay of the separated synchronizing signal so as to be identical with the amount of delay of the separated video signal.

With the above configuration, the amount of delay of the synchronizing signal is automatically adjusted so as to be identical with the amount of delay of the video signal, and hence a proper image can be obtained even when the video signals are transmitted over a long distance.

More preferably, the first adjustment portion includes a plurality of first delay elements having the respective different amounts of delay, the second adjustment portion includes a plurality of second delay elements having the same amounts of delay as the first delay elements, respectively, and the receiving device further includes a counting portion that starts counting a count value depending on an input of the another video signal, and terminates counting the count value depending on an input of the separated video signal, a decode portion that decodes the count value of the counting portion, and a selection portion that selects a first delay element and a second delay element corresponding to the count value decoded by the decode portion from the first delay elements and the second delay elements.

With the above configuration, the amount of delay of the synchronizing signal is automatically adjusted with the second delay element which has the same amount of delay as a delay element selected from the first delay elements having the respective different amounts of delay, and hence a proper image can be obtained even when the video signals are transmitted over a long distance.

The plurality of first delay elements correspond to delay elements 61a-1, 61a-2 and 61a-3, or delay elements 61b-1, 61b-2 and 61b-3 in FIG. 12. The plurality of second delay elements correspond to delay elements 62a-1, 62a-2 and 62a-3, or delay elements 62b-1, 62b-2 and 62b-3 in FIG. 12. The counting portion corresponds to counters 63a and 63b in FIG. 12. The decode portion corresponds to decoders 64a and 64b in FIG. 12. The selection portion corresponds to multiplexers 65a, 66a, 65b and 66b.

According to a second aspect of the present invention, there is provided a signal transmission system including: a receiving device including a separation portion that separates a superimposition signal into a synchronizing signal and a video signal, and a first adjustment portion that adjusts an amount of delay of the separated video signal to another video signal; and a transmitting device including a second adjustment portion that adjusts an amount of delay of the synchronizing signal before the synchronizing signal is transmitted to the receiving device, and a superimposition portion that superimposes the synchronizing signal having the amount of delay adjusted by the second adjustment portion on a video signal to be included in the superimposition signal, and outputs the synchronizing signal and the video signal as the superimposition signal to the receiving device.

With the above configuration, not only the amount of delay of the video signal but also the amount of delay of the synchronizing signal is adjusted, and hence a proper image can be obtained even when the video signals are transmitted over a long distance.

The separation portion corresponds to synchronizing signal/video signal separation circuits 21a and 21b in FIG. 10. The first adjustment portion corresponds to analog delay circuits 23a and 23b in FIG. 10. The second adjustment portion corresponds to delay circuits 13a and 13b in FIG. 11. The superimposition portion corresponds to synchronizing signal/video signal superimposition circuits 11a and 11b in FIG. 11. Also, the separation portion may correspond to synchronizing signal/video signal separation circuits 21a and 21b in FIG. 13. The first adjustment portion may correspond to delay elements 61a-1, 61a-2 and 61a-3, and multiplexer 65a, or delay elements 61b-1, 61b-2 and 61b-3, and multiplexer 65b in FIG. 13. The second adjustment portion may correspond to delay elements 14a-1, 14a-2 and 14a-3, and multiplexer 15a, or delay elements 14b-1, 14b-2 and 14b-3, and multiplexer 15b in FIG. 14. The superimposition portion may correspond to synchronizing signal/video signal superimposition circuits 11a and 11b in FIG. 14.

Preferably, the second adjustment portion automatically adjusts the amount of delay of the synchronizing signal before the synchronizing signal is transmitted to the receiving device so as to be identical with the amount of delay of the video signal.

With the above configuration, the amount of delay of the synchronizing signal is automatically adjusted so as to be identical with the amount of delay of the video signal, and hence a proper image can be obtained even when the video signals are transmitted over a long distance.

More preferably, the first adjustment portion includes a plurality of first delay elements having the respective different amounts of delay, the second adjustment portion includes a plurality of second delay elements having the same amounts of delay as the first delay elements, respectively, the receiving device includes a counting portion that starts counting a count value depending on an input of the another video signal, and terminates counting the count value depending on an input of the separated video signal, a decode portion that decodes the count value of the counting portion, and a first selection portion that selects a first delay element corresponding to the count value decoded by the decode portion from the first delay elements, and the transmitting device includes a second selection portion that selects a second delay element corresponding to the count value decoded by the decode portion from the second delay elements.

With the above configuration, the amount of delay of the synchronizing signal is automatically adjusted with the second delay element which has the same amount of delay as a delay element selected from the first delay elements having the respective different amounts of delay, and hence a proper image can be obtained even when the video signals are transmitted over a long distance.

The plurality of first delay elements correspond to delay elements 61a-1, 61a-2 and 61a-3, or delay elements 61b-1, 61b-2 and 61b-3 in FIG. 13. The plurality of second delay elements correspond to delay elements 14a-1, 14a-2 and 14a-3, or delay elements 14b-1, 14b-2 and 14b-3 in FIG. 14. The counting portion corresponds to counters 63a and 63b in FIG. 13. The decode portion corresponds to decoders 64a and 64b in FIG. 13. The first selection portion corresponds to multiplexers 65a and 65b in FIG. 13. The second selection portion corresponds to multiplexers 15a and 15b in FIG. 14.

According to a third aspect of the present invention, there is provided a control method for a signal transmission system having a transmitting device and a receiving device, comprising the steps of: superimposing at least one synchronizing signal on at least one video signal among a plurality of video signals, and outputs the synchronizing signal and the video signal as a superimposition signal to the receiving device, in the transmitting device; and separating the superimposition signal into the synchronizing signal and the video signal, adjusting an amount of delay of the separated video signal to another video signal, and adjusting an amount of delay of the separated synchronizing signal, in the receiving device.

With the above configuration, not only the amount of delay of the video signal but also the amount of delay of the synchronizing signal is adjusted, and hence a proper image can be obtained even when the video signals are transmitted over a long distance.

According to a fourth aspect of the present invention, there is provided a control method for a signal transmission system having a transmitting device and a receiving device, comprising the steps of: separating a superimposition signal into a synchronizing signal and a video signal, and adjusting an amount of delay of the separated video signal to another video signal, in the receiving device; and adjusting an amount of delay of the synchronizing signal before the synchronizing signal is transmitted to the receiving device, superimposing the synchronizing signal having the adjusted amount of delay on a video signal to be included in the superimposition signal, and outputting the synchronizing signal and the video signal as the superimposition signal to the receiving device, in the transmitting device.

With the above configuration, not only the amount of delay of the video signal but also the amount of delay of the synchronizing signal is adjusted, and hence a proper image can be obtained even when the video signals are transmitted over a long distance.

It should be noted that the present invention is not limited to those exemplary embodiments, and various modifications may be made to them without departing from the scope of the invention.

The Present application is based on Japanese Patent Application No. 2007-300569 filed Nov. 20, 2007, the entire disclosure of which is hereby incorporated by reference.

What is claimed is:

1. A signal transmission system, comprising:
a receiving device; and
a transmitting device including a superimposition portion that superimposes at least one synchronizing signal on at least one video signal among a plurality of video signals, and outputs the synchronizing signal and the video signal as a superimposition signal to a receiving device,
the receiving device including:
a separation portion that separates the superimposition signal into the synchronizing signal and the video signal;
a first delay portion that delays the separated video signal, an amount of delay of the separated video signal being adjustable;
a second delay portion that delays the separated synchronizing signal, an amount of delay of the separated synchronizing signal being adjustable;
a first adjustment portion that adjusts the amount of delay of the separated video signal to another video signal; and
a second adjustment portion that adjusts the amount of delay of the separated synchronizing signal,
wherein the amount of delay of the separated synchronizing signal is adjusted so as to be identical with the amount of delay of the separated video signal.

2. The signal transmission system as claimed in claim 1, wherein the second adjustment portion includes an input portion that inputs the amount of delay of the separated synchronizing signal.

3. The signal transmission system as claimed in claim 2, wherein the second adjustment portion automatically adjusts the amount of delay of the separated synchronizing signal so as to be identical with the amount of delay of the separated video signal.

4. The signal transmission system as claimed in claim 3, wherein the first delay portion includes a plurality of first delay elements each having a different amount of delay,
the second delay portion includes a plurality of second delay elements each having the same amount of delay as one of the first delay elements, and
the receiving device further includes:
a counting portion that starts counting a count value depending on an input of the another video signal, and terminates counting the count value depending on an input of the separated video signal,
a decode portion that decodes the count value of the counting portion, and
a selection portion that selects a first delay element and a second delay element corresponding to the count value decoded by the decode portion from the first delay elements and the second delay elements.

5. The signal transmission system as claimed in claim 1, wherein the first delay portion includes a plurality of first delay elements for delaying the separated video signal, each of the first delay elements having a different amount of delay, and
the second delay portion includes a plurality of second delay elements for delaying the separated synchronizing signal, each of the second delay elements having the same amount of delay as one of the first delay elements.

6. The signal transmission system as claimed in claim 5, wherein the receiving device further includes:
a counting portion that starts counting a count value when the another video signal is input and terminates counting the count value when the separated video signal is input, and
a selection portion that selects one of the first delay elements and a second delay element having the delay amount the same as the selected first delay element corresponding to the count value.

7. The signal transmission system as claimed in claim 6, wherein the receiving device further includes:
a decode portion that decodes the count value of the counting portion,
wherein the selection portion selects the first delay element and the second delay element corresponding to the counted value decoded by the decode portion.

8. The signal transmission system as claimed in claim 5, wherein the receiving device further includes
a first multiplexer that selects one of the signals output from the first delay elements;
a second multiplexer that selects one of the signals output from the second delay elements; and
a controller that controls the first multiplexer and the second multiplexer to select one signal based on a time lag between a reception of the another video signal and a reception of the separated video signal.

9. A signal transmission system, comprising:
a receiving device including a separation portion that separates a superimposition signal into a synchronizing signal and a video signal, and a first adjustment portion that adjusts an amount of delay of the separated video signal to another video signal; and a transmitting device including a second adjustment portion that adjusts an amount of delay of the synchronizing signal before the synchronizing signal is transmitted to the receiving device, and a superimposition portion that superimposes the synchronizing signal having the amount of delay adjusted by the second adjustment portion on a video signal to be included in the superimposition signal, and outputs the synchronizing signal and the video signal as the superimposition signal to the receiving device, wherein the second adjustment portion automatically adjusts the amount of delay of the synchronizing signal before the synchronizing signal is transmitted to the receiving device so as to be identical with the amount of delay of the video signal.

10. The signal transmission system as claimed in claim 9, wherein the first adjustment portion includes a plurality of first delay elements having the respective different amounts of delay, the second adjustment portion includes a plurality of second delay elements having the same amounts of delay as the first delay elements, respectively, the receiving device includes a counting portion that starts counting a count value depending on an input of the another video signal, and terminates counting the count value depending on an input of the separated video signal, a decode portion that decodes the count value of the counting portion, and a first selection portion that selects a first delay element corresponding to the count value decoded by the decode portion from the first delay elements, and the transmitting device includes a second selection portion that selects a second delay element corresponding to the count value decoded by the decode portion from the second delay elements.

11. A control method for a signal transmission system having a transmitting device and a receiving device, comprising:

superimposing at least one synchronizing signal on at least one video signal among a plurality of video signals, and outputs the synchronizing signal and the video signal as a superimposition signal to the receiving device, in the transmitting device; and separating the superimposition signal into the synchronizing signal and the video signal, adjusting an amount of delay of the separated video signal to another video signal, and adjusting an amount of delay of the separated synchronizing signal, in the receiving device, wherein the adjusted amount of delay of the separated synchronizing signal is identical with the adjusted amount of delay of the separated video signal.

12. A control method for a signal transmission system having a transmitting device and a receiving device, comprising:

separating a superimposition signal into a synchronizing signal and a video signal, adjusting an amount of delay of the separated video signal to another video signal, in the receiving device, and notifying the transmitting device of an adjusted amount of the separated video signal; and adjusting an amount of delay of a synchronizing signal to be superimposed on a video signal so as to be identical with the notified adjusted amount of delay of the separated video signal, superimposing the synchronizing signal having the adjusted amount of delay on the video signal to be included in the superimposition signal, and outputting the synchronizing signal and the video signal as the superimposition signal to the receiving device, in the transmitting device.

* * * * *